Dec. 19, 1967    R. N. HALL    3,359,509
SEMICONDUCTIVE JUNCTION LASER WITH TEMPERATURE COMPENSATION
Filed Feb. 19, 1964

Inventor:
Robert N. Hall,
by John F. Ahern
His Attorney.

3,359,509
SEMICONDUCTIVE JUNCTION LASER WITH TEMPERATURE COMPENSATION
Robert N. Hall, Schenectady, N.Y., assignor to General Electric Company, a corporation of New York
Filed Feb. 19, 1964, Ser. No. 345,886
6 Claims. (Cl. 331—94.5)

ABSTRACT OF THE DISCLOSURE

A semiconductor junction laser having a reflector cavity fabricated of material whose index of refraction changes with temperature in a direction opposite to that of the semiconductive laser material, so that frequency of output radiation remains essentially constant over a wide temperature range. The dimensions of the cavity are selected so that the ratio of the radiation path length in the reflector to the radiation path length in the junction is equal to, and opposite in sign to, the ratio of the temperature coefficient of refraction in the laser material to the corresponding coefficient for the reflector material.

---

Figure 1:
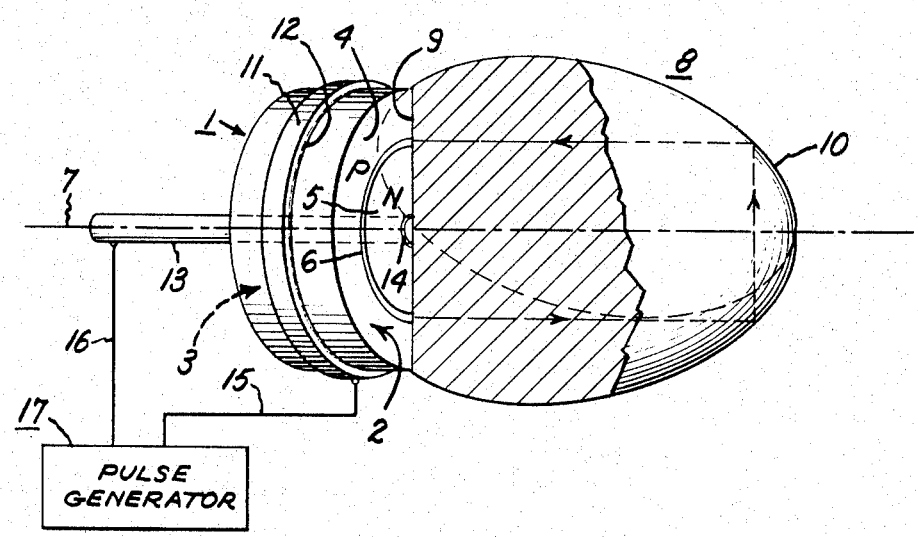

The present invention relates generally to the generation of stimulated coherent radiation utilizing semiconductor junction devices, and more specifically pertains to such devices having an output frequency that is substantially independent of the temperature of the device.

Semiconductor junction diodes adapted to provide generation of stimulated coherent radiation are described in an article entitled, "Coherent Light Emission From P-N Junctions," appearing in Solid-State Electronics, vol. 6, page 405, 1963, that is intended to be incorporated herein by reference thereto. Diodes of this type are referred to herein, and in the appended claims, as semiconductor junction lasers.

The discovery of the semiconductor junction laser enabled more efficient generation of stimulated coherent radiation of light, not necessarily visible but infrared as well, and also of microwave frequencies, utilizing less complex equipment. In some applications it is desirable that the frequency of coherent radiation, emitted from semiconductor junction lasers, be maintained more nearly constant in the presence of temperature variations in the ambient temperature of the semiconductive material, than is ordinarily obtainable from heretofore known devices of this type.

Accordingly, one object of the present invention is to provide a source of stimulated coherent radiation which has an output frequency that is substantially independent of variations in ambient temperature.

Another object of the present invention is to provide semiconductor devices, adapted to serve as sources of stimulated coherent radiation, having an essentially constant frequency over a wide temperature range.

Still another object of the present invention is to provide a semiconductor junction laser device featuring substantial temperature compensation.

Briefly stated, in accord with one embodiment of my invention, I provide a semiconductor junction laser device wherein radiation generated within the semiconductive material exits therefrom and travels a predetermined distance in a reflector cavity fabricated from a material having an index of refraction that changes with temperature in the opposite direction as changes in the index of refraction of the semiconductive laser material. Substantial temperature compensation is accomplished, conveniently, by providing a reflecting cavity having dimensions such that the ratio of the distance traveled by radiation in the reflector to the distance traveled in the junction is equal to, and opposite in sign to, the ratio of the temperature coefficient of refraction in the semiconductive laser material to the corresponding coefficient for the material of the reflector. In this way, the effects of temperature variation upon the index of refraction in the two mediums cancel to provide a device wherein the frequency of the emitted radiation is substantially independent of the ambient temperature of the device.

Figure 2:
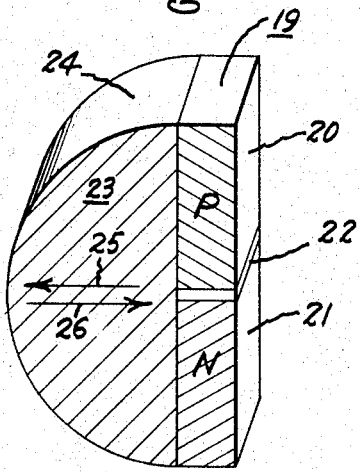

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

FIGURE 1 is a perspective view of a semiconductor junction laser device in accord with my invention; and, FIGURE 2 is a perspective view of an alternative embodiment of a device in accord with my invention.

In the embodiment of my invention that is illustrated in FIGURE 1 of the drawings, a stimulated coherent emission semiconductor device, or junction laser device, comprises a monocrystalline body 1 of semiconductive material that is, preferably, a direct electron transition semiconductive material. Monocrystalline body 1 has at least one substantially planar surface 2, and preferably, a second substantially planar surface 3 that is parallel with surfce 2. Surfaces 2 and 3 are advantageously made as exactly parallel to each other as possible in order to form a partial reflecting cavity, in which case they perform substantially as the reflecting faces of a Fabry Perot interferometer, and hence oftentimes are referred to as Fabry Perot faces.

Monocrystalline body 1 is adapted to provide stimulated coherent emission by providing therein a degenerately impregnated, or doped, P-type region 4 (having degenerate P-type conductivity characteristics) and a degenerately impregnated, or doped, N-type region 5 (having degenerate N-type conductivity characteristics). Both the P-type and N-type regions of semiconductive crystal 1 are impregnated, or doped, with a sufficient concentration of acceptor and donor activators, respectively, to cause degeneracy therein.

A P-N junction region 6 terminates at substantially planar surfaces 2 and 3 and has an axis 7 of symmetry that is perpendicular to surfaces 2 and 3. Thus, P-N region 6 extends linearly, in the direction of its axis 7 of symmetry, between parallel faces 2 and 3.

The device includes a reflector 8 having a planar surface 9 that is contiguous with surface 2 and a curved surface 10 that is the outer surface of an ellipsoid having a central focal point lying on axis 7 and a line of foci substantially coinciding with the intersection of region 6 and surface 2, as more particularly disclosed and claimed in my copending application Ser. No. 345,884, filed concurrently herewith.

In order to cause a population inversion in region 6 and emission of stimulated coherent radiation from within body 1, and out through surface 2 substantially perpendicular thereto, it is necessary to provide means for applying a unidirectional current to monocrystalline body 1 that is sufficient to bias region 6 in a forward direction. In the illustration of FIGURE 1, non-rectifying contact is made between P-type region 4 and a first electrode 11 by means of an acceptor type or electrically neutral solder layer 12 and a non-rectifying connection is made between N-type region 5 and a second electrode 13 by means of a donor type or electrically neutral solder 14. Electrodes 11 and 15 are adapted to be connected to a suitable source of unidirectional current.

In operation, electrodes 11 and 13 are advantageously connected to a source of pulsed direct current, as by conductors 15 and 16, respectively, which are illustrated schematically as connecting the electrodes to pulse generator 17. The pulse generator is adapted to supply pulses of direct current at high current levels, as for example, approximately 2000 to 50,000 amperes per square centimeter of junction area for a gallium arsenide diode.

The pulse width to avoid overheating is conveniently kept to a low level of approximately 1 to 10 microseconds. It has been found that the threshold for stimulated coherent light emission from a gallium arsenide diode, for example, is related to the temperature of the diode, and it may be convenient to subject the diode to a low temperature to lower the threshold for coherent emission and preclude the necessity of a high current source. Thus, for example, when a diode of gallium arsenide is immersed in a Dewar flask of liquid air at a temperature of approximately 77° K. the threshold for coherent emission occurs at approximately 2000 amperes per square centimeter and decreases to less than 200 amperes per square centimeter at 20° K. Since the junction area may conveniently be approximately .005 centimeter$^2$, a ten ampere pulsed source is sufficient at 77° K., as is a one ampere source at 20° K.

When monocrystalline semiconductive body 1 is subjected to the aforementioned electrical stimulation, coherent radiation is obtained therefrom which exits from the intersection of junction region 6 with surfaces 2 and 3. The coherent radiation is emitted in a direction substantially parallel to the axis 7. The radiation exiting through surface 3 normally provides the useful output and that exiting from surface 2 travels parallel to axis 7 until it strikes surface 10. The emitted radiation, from the edge of junction 6 that intersects surface 2, is doubly reflected in reflector 8 back to the symmetrically opposite portion of the junction from the portion where it was emitted. Thus, the reflected radiation travels a distance equal to two times the length of the major axis of the ellipse that is rotated about axis 7 to describe the ellipsoid reflector 8.

In accord with my invention the material and dimensions of reflector 8 are selected to provide cancellation of the effects of temperature variation on the wavelength of light generated within monocrystalline body 1. The frequency change in semiconductive junction laser devices with variations in temperature is almost entirely due to changes in the index of refraction of the semiconductive material with temperature. The index of refraction is equal to the velocity of propagation of radiation of a given frequency in vacuum to that in the medium under consideration.

In semiconductor junction lasers the change in index of reflection with variations in temperature usually causes a change in operating frequency that is at least one order of magnitude more significant than changes in the dimensions of the material due to variations in temperature. In general, semiconductive materials, at the temperature wherein they are usable for semiconductive junction lasers, possess a positive temperature coefficient of refraction. That is to say, the velocity of radiation propagated therein decreases in response to an increase in temperature and, hence, the frequency of coherent radiation changes in the opposite direction as variations in temperature.

In accord with my invention the reflector body 8 is selected of a material having a temperature coefficient of refraction (change in refractive index per unit change in temperature) that is opposite in sign to that of the semiconductive body 1. When the temperature coefficient of refraction of semiconductor body 1 is positive, as is normally the case, the temperature coefficient of refraction of the material from which reflector 8 is fabricated is negative. The absolute magnitude of the two temperature coefficients of refraction is used to determine the selected relative distances the radiation travels in semiconductor body 2 and reflector 8. The relationship that must be achieved for maximum effectiveness, in accord with my invention, is that the ratio of the distance radiation travels in semiconductive body 1 to the distance that the radiation travels in reflector 8 is equal to, but opposite in sign to, the ratio between the temperature coefficient of refraction in the reflector 8 to the temperature coefficient of refraction in semiconductive body 1, for the frequency of stimulated radiation that is generated within semiconductive body 1. The change of sign is due, of course, to the fact that only one of the two temperature coefficients of refraction is negative.

In operation, semiconductive body 1 is electrically biased to an extent such that it would not by itself provide coherent radiation. Then, the effect of reflector 8 is to return sufficient radiation to junction 6 such that stimulated coherent radiation occurs at a frequency substantially determined by the combined resonant characteristics of semiconductive body 1 and reflector 8. It is preferred that surfaces 2 and 9 be as transparent as possible and that their common interface be substantially non-reflecting at the frequency of radiation emitted in order to minimize the effect of the individual resonant cavities defined by surfaces 2 and 3 and 9 and 10, respectively, and to maximize the role of the cavity defined by surfaces 3 and 10 in determining the output frequency.

Suitable materials for fabrication of reflector 8 include the following:

| Material: | Temperature coefficient of refraction (per ° K.) |
|---|---|
| LiF | $-1.6 \times 10^{-5}$ |
| AgCl | $-6.1 \times 10^{-5}$ |
| KBr | $-4 \times 10^{-5}$ |
| TlBrI | $-25 \times 10^{-5}$ |
| CsI | $-10 \times 10^{-5}$ |
| KCl | $-3 \times 10^{-5}$ |
| KI | $-5 \times 10^{-5}$ |

The preceding table gives the temperature coefficient of refraction of materials suitable for use in accord with my invention at room temperature. A detailed description of these materials and their properties is to be found in The University of Michigan Willow Run Laboratories Report No. 2389–11–5 of January 1959 entitled "State-of-the-Art Report, Optical Materials for Infrared Instrumentation." There is usually a change in the temperature coefficient of refraction of materials with temperature and it is important that the coefficients for the semiconductive material of the laser and the material of the reflector be taken at approximately the same temperature, preferably, a temperature within the range of operating temperatures. For example, the temperature coefficient of refraction of gallium arsenide at room temperature is approximately $160 \times 10^{-5}$ per ° K., whereas the same coefficient is equal to about $18 \times 10^{-5}$ per ° K. at a temperature of 50 °K.

When body 1 is fabricated from gallium arsenide, for example, the ratio of the distance traveled by radiation in the reflector to that traveled in body 1 is made equal to 160/25 (6.4), when the material of reflector 8 is selected to be TlBrI. In the device of FIGURE 1 this is achieved conveniently by making the ellipsoid reflector a body of revolution from an ellipse having a major diameter that is equal to 6.4 times the axial length of body 1.

In order to enhance the transmission of radiation across the interface comprising surfaces 2 and 9 the medium of reflector 8 is advantageously selected to have an index of refraction that does not differ appreciably from that of the semiconductive body 1. This condition is approximately fulfilled by selecting TlBrI as the material for reflector 8 because this material has an index of refraction of about 2.5, whereas that of gallium arsenide, for example, has an index of refraction of about 3.6. It is preferred that the material of reflector 8 be a solid that is transparent at the frequency of radiation, rather than a gas within an enclosure, because gases have indexes of refraction that usually are approximately equal to 1.

In general, a semiconductive junction laser, of the type shown as body 1, is fabricated by providing a cylindrical body of direct electron transmission semiconductive material which is degenerately impregnated, or doped, to be of one conductivity type. The material is thereafter heated in the presence of an impurity of the other conductivity-determining type to provide the required P-N junction region. Then, planar surfaces 2 and 3 are ground and polished to exact parallelism, providing the structure illustrated in FIGURE 1.

One highly desirable method is to form a thin monocrystalline wire of N-type gallium arsenide which is impregnated, or doped, with approximately $10^{18}$ atoms per cubic centimeter of tellurium. The impregnation is achieved, conveniently, by growth from a melt of gallium arsenide containing at least $5 \times 10^{18}$ atoms per cubic centimeter of tellurium to cause the resulting crystal to be degenerately N-type. The thin wire is advantageously grown by seed crystal withdrawal technique, for example, in accord with the teaching of my U.S. patent 3,265,469 issued Aug. 9, 1966, a continuation-in-part of my abandoned application, Ser. No. 60,898, filed Oct. 6, 1960, both of which are assigned to the assignee of the present invention.

The wire of semiconductive material has a cylindrical junction region conveniently formed therein by diffusing zinc into all surfaces thereof at a temperature of approximately 900° C. for approximately one half hour using evacuated sealed quartz tube containing the gallium arsenide crystal and 10 milligrams of zinc. The P-N junction so formed is approximately 0.05 millimeter below all surfaces of the crystal. The end surfaces of the crystal wire are then polished to optical smoothness and to exact parallelism perpendicular to the axis of symmetry of the wire. With the aforementioned gallium arsenide crystal, acceptor solder is an alloy of 3 weight percent zinc, remainder being indium, and donor solder is conveniently tin.

A reflector body in accord with this invention is fabricated from the selected material by any of a plurality of techniques well-known to those skilled in the art, including cutting, grinding and polishing. The configuration of the reflector can be a simple geometrical figure or the reflector can be fabricated in the form of more complex configurations including the ellipsoid of FIGURE 1 and others disclosed and claimed in my aforementioned copending application. The last-mentioned application discloses, in addition to ellipsoids, reflectors such as, for example, paraboloids and approximating spherical segments.

The reflector body and laser element are advantageously joined by pressing their respective contiguous flat surfaces into optical contact in a jig, that can conveniently include two flat glass plates biased together and sandwiching the tow bodies together. Alternative means, for joining the reflector and laser element well-known to those skilled in the art, include the use of refractive-index-matching cement, as Canada Balsam, and the use of an intervening layer of immersion oil of the type often used with microscope analysis. The latter method of joining offers the additional advantage of allowing controlled relative movement between the reflector and laser element for alignment and calibration purposes, for example.

FIGURE 2 illustrates an alternative embodiment of a temperature compensated laser fabricated in accord with the present invention. Laser body 19 is preferably fabricated of a direct electron transition monocrystalline semiconductive body. Body 19 includes a degenerately impregnated, or doped, P-type region 20 and a degenerately impregnated, or droped, N-type region 21 with a P-N junction region 22 between and contiguous with regions 20 and 21. A reflector 23 having a curved surface 24 is adapted to receive radiation from junction 22, schematically illustrated as ray 25, and to reflect the radiation back to junction 22, as schematically illustrated by ray 26. Because the coherent radiation is normally substantially parallel to the major surface of junction 22, it is not, in general, required that curved surface 24 be adapted to return radiation deviating greatly from the path illustrated by ray 25. Because the considerations of dimensions, refractive index, and temperature coefficient of refraction are the same in the embodiment of FIGURE 2 as previously discussed in conjunction with FIGURE 1, no repetition thereof is deemed necessary.

There has been shown and described herein semiconductor junction laser devices which provide coherent output radiation of a frequency that is substantially independent of the ambient temperature of the device. While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A temperature stabilized semiconductor junction laser device comprising: a monocrystalline body of semiconductive material having a P-N junction region therein for generating stimulated coherent radiation in at least one direction relative to said body in response to electrical excitation of said P-N junction region, said body having a planar surface perpendicular to said P-N junction; means for providing electrical excitation of said P-N junction region; and, a temperature compensating material having a planar surface located adjacent to said body, said temperature compensating material receiving said radiation and reflecting at an interior boundary thereof at least a portion of said radiation back to said P-N junction region, said temperature compensating material and said body together comprising an output frequency selective resonant cavity in which said radiation travels a first distance in the semiconductive material of said body and a second distance in said temperature compensating material, the ratio of said first distance to said second distance being approximately equal in magnitude and opposite in sign to the ratio of the temperature coefficient of refraction of said temperature compensating material to the temperature coefficient of refraction of said semiconductive material, so that the effect of temperature changes on the refractive index of said semiconductive body is cancelled, whereby the output frequency of said laser device is substantially independent of temperature changes.

2. The device of claim 1 wherein the temperature coefficient of refraction of said semiconductive body is positive and said temperature compensating material is selected from the group consisting of LiF, AgCl, KBr, TlBrI, CsI, KCl, and KI.

3. The device of claim 1 wherein said semiconductive material consists essentially of gallium arsenide.

4. A temperature stabilized stimulated coherent emission semiconductor device comprising: a monocrystalline body of semiconductive material; a first region within said body having degenerate N-type conductivity characteristics; a second region within said body having degenerate P-type conductivity characteristics; a very thin third region located between and contiguous with said first and second regions having conductivity characteristics intermediate the conductivity characteristics of said first and second regions, said third region extending linearly in at least one direction; at least two surface portions of said body being parallel with each other, perpendicular to said third region and spaced from each other in said one direction; means for applying a unidirectional current to said monocrystalline body sufficient to bias said regions in the forward direction to cause a population inversion and emission of stimulated coherent radiation through at least one of said two surface portions; a temperature compensating material having a planar surface located adjacent to said body, said temperature compensating material receiving radiation emitted from said third region through one of said surface portions and returning said radiation from an interior boundary of said material to said third region after said radiation travels a predetermined distance in said temperature compensating material, said temperature compensating material and said body together comprising a resonant cavity and the ratio of the distance that radiation travels in said body to said predetermined distance being substantially equal in magnitude and opposite in sign to the ratio of the temperature coefficient of refraction in said temperature compensating material to the temperature coefficient of refraction in the semiconductive material of said third region.

5. The device of claim 4 wherein a surface of said reflector is contiguous with said one surface.

6. The device of claim 5 wherein the temperature coefficient of refraction of said semiconductive body is positive and said temperature compensating material is selected from the group consisting of LiF, AgCl, KBr, TlBrI, CsI, KCl and KI.

References Cited
UNITED STATES PATENTS 3,153,204 10/1964 Dunsmuir _____ 331—94.5
3,248,670 4/1966 Dill et al. _____ 331—94.5

JEWELL H. PEDERSEN, *Primary Examiner.*

E. S. BAUER, R. L. WIBERT, *Assistant Examiners.*